(12) United States Patent
Murphy et al.

(10) Patent No.: US 8,279,197 B2
(45) Date of Patent: Oct. 2, 2012

(54) METHOD AND APPARATUS FOR DETECTING DEFECTIVE TRACES IN A MUTUAL CAPACITANCE TOUCH SENSING DEVICE

(75) Inventors: Thomas Murphy, Boulder Creek, CA (US); Kevin Rathburn, Campbell, CA (US); Keen Hun Leong, Penang (MY); Sarangan Narasimhan, San Jose, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 493 days.

(21) Appl. No.: 12/547,354

(22) Filed: Aug. 25, 2009

(65) Prior Publication Data

US 2011/0050617 A1    Mar. 3, 2011

(51) Int. Cl.
*G06F 3/044* (2006.01)
(52) U.S. Cl. .................. 345/174; 345/173; 345/178
(58) Field of Classification Search ........... 345/173–178
See application file for complete search history.

(56) References Cited

U.S. PATENT DOCUMENTS

| | | | |
|---|---|---|---|
| 6,977,646 B1 | 12/2005 | Hauck et al. | |
| 8,111,243 B2 * | 2/2012 | Peng et al. | 345/173 |
| 2008/0157782 A1 | 7/2008 | Krah | |
| 2008/0278453 A1 | 11/2008 | Reynolds | |
| 2008/0309623 A1 | 12/2008 | Hotelling et al. | |
| 2009/0284492 A1 * | 11/2009 | Chino | 345/174 |
| 2010/0026664 A1 * | 2/2010 | Geaghan | 345/174 |
| 2010/0103137 A1 * | 4/2010 | Ciesla et al. | 345/174 |

OTHER PUBLICATIONS

Tough Touch Screen, Hal Philipp, Applicance Design, Feb. 2006.

* cited by examiner

*Primary Examiner* — Van Chow
(74) *Attorney, Agent, or Firm* — Winston Hsu; Scott Margo

(57) ABSTRACT

Several different methods of testing the integrity and proper operation of the drive and sense electrodes in a mutual capacitance sensing device such as a touchscreen or touchpad are disclosed herein. According to one embodiment, measured values of mutual capacitance corresponding to individual cells in a mutual capacitance sensing device are compared to one another and to predetermined thresholds. The results of the comparison are employed to determine whether any of the traces forming the electrodes in the device are defective. By way of example, traces can be defective if they are broken, too thin, too thick, or shorted together. The various embodiments of the methods disclosed herein may be used for touchscreen or touchpad quality control in a manufacturing setting, or may be used to test touchscreens or touchpads that have already been incorporated into electronic devices. The various methods disclosed herein lower manufacturing costs, increase product quality and yield, and may be carried out quickly.

41 Claims, 13 Drawing Sheets

METHOD AND APPARATUS FOR DETECTING DEFECTIVE TRACES IN A MUTUAL CAPACITANCE TOUCH SENSING DEVICE

FIELD OF THE INVENTION

Various embodiments of the invention described herein relate to the field of capacitive sensing input devices generally, and more specifically to mutual capacitance measurement or sensing systems, devices, components and methods finding particularly efficacious applications in touchscreens and/or touchpads, especially those underlain by LCD displays. Embodiments of the invention described herein include those amenable for use in portable or hand-held devices such cell phones, MP3 players, personal computers, game controllers, laptop computers, PDA's and the like. Also described are embodiments adapted for use in stationary applications such as in industrial controls, household appliances, exercise equipment, and the like.

BACKGROUND

Two principal capacitive sensing and measurement technologies are currently employed in most capacitive touch sensing devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger. The human body is essentially a capacitor to a surface where the electrical field vanishes, and typically has a capacitance of around 100 pF.

Electrodes in self-capacitance touchscreens and/or touchpads are typically arranged in rows and columns. By scanning first rows and then columns the locations of individual disturbances induced by the presence of a finger, for example, can be determined.

Typically, rows and columns of electrodes in self-capacitance sensing devices such as touchscreens or touchpads comprise electrically conductive traces or strips of indium tin oxide ("ITO") laid down on a glass or plastic substrate.

During and after the process of forming such traces on a suitable substrate, defects in such traces or strips will arise, at least in some of the self-capacitance sensing devices. Common defects in ITO traces in touchscreens include shorting between traces, shorting between one or more traces and ground, broken traces, traces that are too thin, too narrow, too thick or too wide, unintended irregularities in the geometries of individual traces, and the like.

Because the foregoing and other defects in ITO traces can significantly affect the performance of a touchscreen or touchpad, testing is often carried out on individual self-capacitance sensing devices after the manufacturing process has been completed. Once such testing method for self-capacitance touch sensing devices is described in U.S. Patent Publication No. 2008/0278453 to Reynolds et al. entitled "Production Testing of a Capacitive Sensing Device."

There are several problems with testing the integrity of ITO or other types of electrodes in a self-capacitance sensing device, however, such as the need to provide by relatively complicated and time-consuming means precise external stimuli to different locations of a touchscreen to mimic a users touch at predetermined locations thereof, the relatively small changes in self-capacitance that occur as a result of broken or otherwise defective traces, and the small changes in self-capacitance that normally occur along the length of a given electrode trace that is in good operating order. In addition, self-capacitance sensing devices are difficult to test in the field owing to the need to provide the precise external stimuli described above. As a result, self-capacitance sensing devices are very difficult to test in the field.

The second primary capacitive sensing and measurement technology employed in capacitive touch sensing devices is that of mutual capacitance, where measurements are typically performed using a crossed grid of electrodes. See, for example, U.S. Pat. No. 5,861,875 to Gerpheide entitled "Methods and Apparatus for Data Input" dated Jan. 19, 1999. In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of n×n intersections with only 2n pins on an IC.

What is needed is a capacitive measurement system that may be employed in touchscreen or touchpad applications that may be tested for trace integrity and proper operation after the touchscreen or touchpad manufacturing process has been completed, as well as after the device has been incorporated into or operably connected to an electronic device that is fast, accurate and of low cost.

SUMMARY

In one embodiment, there is provided a method of testing a mutual capacitance sensing device comprising applying a drive signal to a first row or column of drive electrodes from among a plurality of drive electrodes arranged substantially parallel to one another, measuring respective relative mutual capacitances generated by the drive signal using a plurality of columns or rows of sense electrodes which intersect the rows or columns of drive electrodes at an angle, the columns or rows of sense electrodes being arranged substantially parallel to one another, associating the measured respective relative mutual capacitances with cells corresponding to intersecting drive and sense electrode locations, determining differences between the measured relative capacitances of adjoining cells, determining whether any of the differences exceed or fall below predetermined thresholds corresponding thereto, and identifying one or more defective traces on the basis of the differences exceeding or falling below the predetermined thresholds.

In another embodiment, there is provided a method of testing a mutual capacitance sensing device for defective traces, comprising applying a drive signal to a first row or column of drive electrodes, measuring, in at least first and second columns or rows of sense electrodes arranged at an angle with respect to the first row or column, first and second capacitances resulting from the drive signal being applied to the first row or column, the first and second columns and rows being arranged substantially parallel to one another, applying the drive signal to a second row or column of drive electrodes arranged substantially parallel to the first row or column, measuring, in the first and second columns or rows of sense electrodes, third and fourth capacitances resulting from the drive signal being applied to the second row or column, the first, second, third and fourth measured capacitances corresponding to respective first, second, third and fourth cells in the sensing device, determining, for adjoining cells, differences between measured capacitances, and determining whether any of the differences exceed or fall below predetermined thresholds corresponding to the first, second, third or fourth cells, thereby indicating the presence of one or more defective traces in or near such cells.

In yet another embodiment, there is provided a method of testing a mutual capacitance sensing device for defective traces, comprising applying a drive signal to a first row or column of drive electrodes, measuring a first capacitance resulting from the drive signal being applied to the first row or column of drive electrodes in a first column or row of sense electrodes forming an angle with respect to the first row or column, measuring a second capacitance resulting from the drive signal being applied to the first row or column of drive electrodes in a second column or row of sense electrodes arranged substantially parallel to the first column or row of sense electrodes, applying the drive signal to a second row or column of drive electrodes arranged substantially parallel to the first row or column of drive electrodes, measuring a third capacitance resulting from the drive signal being applied to the second row or column of drive electrodes in the first column or row of sense electrodes, measuring a fourth capacitance resulting from the drive signal being applied to the second row or column of drive electrodes in the second column or row of sense electrodes, the first, second, third and fourth measured capacitances corresponding to respective first, second, third and fourth cells in the sensing device, and comparing the first, second, third and fourth measured capacitances to predetermined thresholds corresponding thereto.

In still another embodiment, there is provided a mutual capacitance touchscreen comprising a first set of electrically conductive traces arranged in rows or columns and a second set of electrically conductive traces arranged in rows or columns arranged at an angle with respect to the rows or columns of the first set, wherein the first and second sets of traces are electrically insulated from another, each cell comprising a plurality of sub-cell rectangular or square drive electrodes electrically connected to one another by first cross-over traces and a plurality of sub-cell rectangular or square sense electrodes electrically connected to one another by second cross-over traces, the sub-cell drive and sense electrodes being interleaved with respect to, and disposed in between, one another within each cell, the sub-cell sense and drive electrodes being separated by gaps within each cell, the first and second sets of electrically conductive traces comprising and being electrically connected to the drive and sense electrodes.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME PREFERRED EMBODIMENTS

Figure 1:
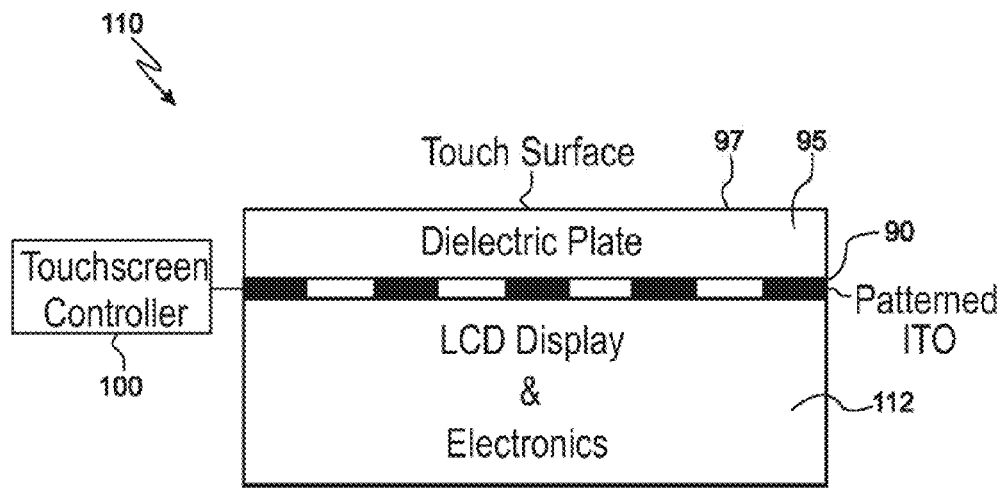
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100.

Figure 2:
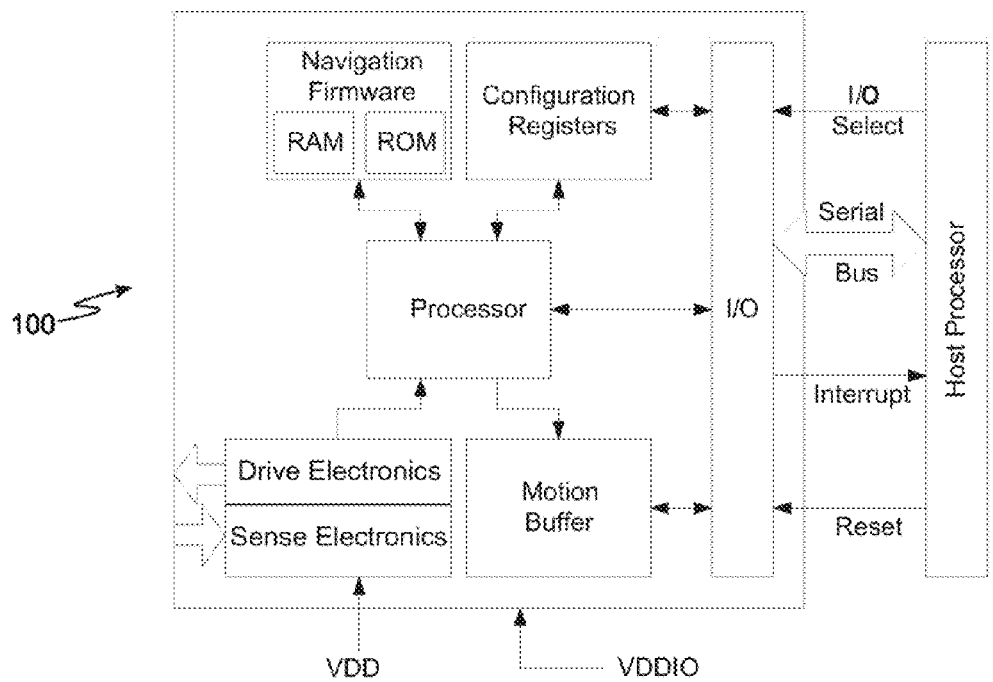
FIG. 2 shows a block diagram of a touchscreen controller.

FIG. 2 shows a block diagram of an Avago Technologies™ AMRI-5000 ASIC or chip 100, which is a low-power capacitive touch-panel controller designed to provide a touchscreen system with high-accuracy, on-screen navigation. Capacitive touchscreens 90 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which creates a disruption. The touchscreen controller 100 senses and analyzes the coordinates of these disruptions. When the touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for the AMRI-5000 chip include, but are not limited to, smart phones, portable media players, mobile internet devices (MIDs), and GPS devices.

Figure 3:
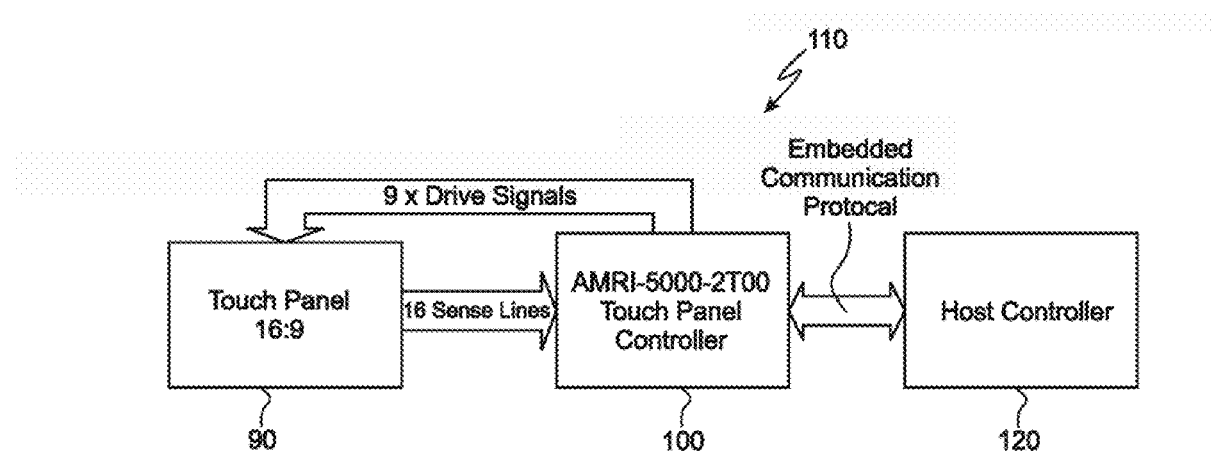
FIG. 3 shows one embodiment of a block diagram of a touchscreen system and a host controller.
Figure 4:
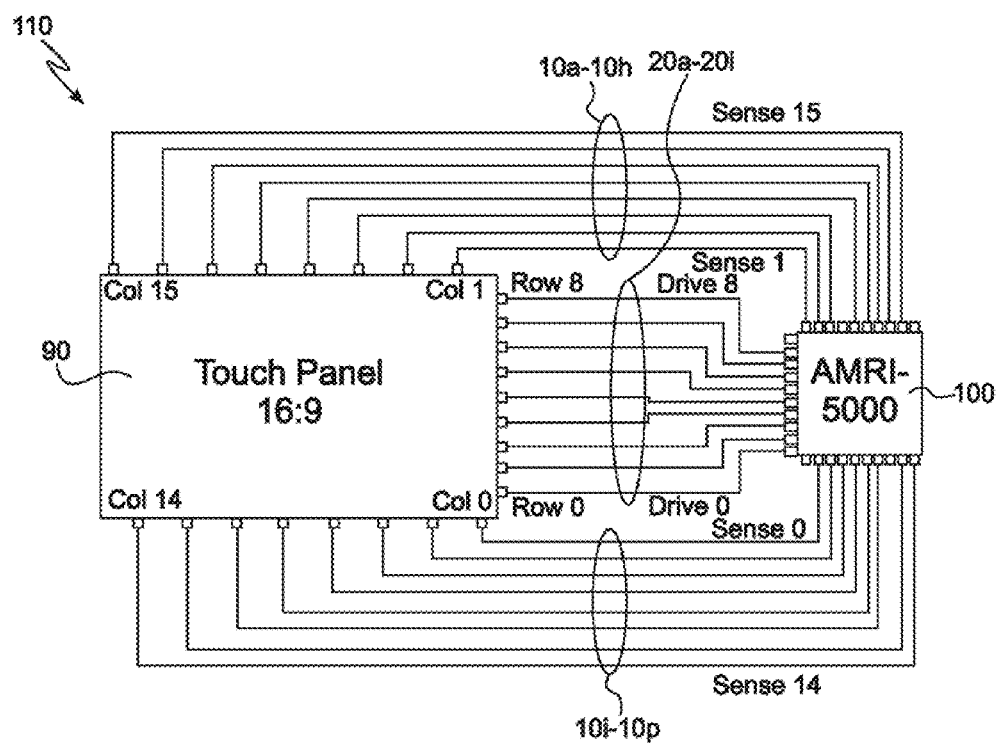
FIG. 4 shows a schematic block diagram of one embodiment of a touchscreen system.

Referring now to FIGS. 3 and 4, in one embodiment the AMRI-5000 touchscreen controller 100 includes an analog front-end with 9 drive signal lines and 16 sense lines connected to an ITO grid on a touchscreen. The controller 100 applies an excitation square wave to the drive electrodes that may have a frequency selected from a range between about 40 kHz and about 200 kHz. The AC signal is coupled to the sense lines via mutual capacitance. Touching the panel 90 with a finger alters the capacitance at the location of the touch. The AMRI-5000 controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading.

The AMRI-5000 touchscreen controller 100 features multiple operating modes with varying levels of power consumption. In rest mode the controller periodically looks for touches at a rate programmed by the rest rate registers. There are multiple rest modes, each with successively lower power consumption. In the absence of a touch for a certain interval the controller 100 automatically shifts to the next-lowest power consumption mode. However, as power consumption is reduced the response time to touches increases.

Referring still to FIGS. 3 and 4, timing control in system 110 is provided with a "heartbeat" timing method. The hardware generates a heartbeat at regular intervals. Every time a heartbeat occurs, the hardware is triggered to acquire a new line of touch panel data. When acquisition is finished, a firmware interrupt is generated to trigger the firmware to process the newly acquired data. Once all lines of a frame (a complete panel scan) have been acquired, the firmware branches to the navigation code to interpret the data and report any touches to the host system. System 110 includes the ability to reduce the heartbeat rate in order to save power when there are no touches present on the panel. In such a mode a long heartbeat is added after each frame is acquired.

In respect of data acquisition, on each heartbeat the hardware applies a square wave drive signal a selected one of the drive lines, and reads the capacitance values for each of sense lines 1-16 corresponding to the cells in the current row.

The firmware of system 110 comprises a base system which resides in on-chip ROM, plus "patch" code that is loaded into on-chip RAM by the host after power up. This gives system 1110 the ability to update firmware after the IC 100 has been manufactured.

Patch code is loaded by putting IC 100 into "patch download" mode and then writing each byte of patch code in succession to the patch download register. The ROM code is responsible for decoding the bytes and writing the code into the RAM space. Once loading is completed and the CRC has been verified, the ROM code updates the jump table to enable the new patch code. A firmware reset is then performed to start executing the newly loaded code.

With respect to control registers, in one embodiment AMRI-5000 100 incorporates up to 128 registers that control system behavior and report data to the host. These registers may be accessed by the host via TWI or SPI interfaces, and may include functionality such as adjusting analog gain, controlling various filters, setting the number of active drive and sense lines on the panel, setting the virtual height and width of the panel (which determines the coordinates returned to the host), and selecting which events cause host interrupts.

With respect to navigation, the firmware is responsible for interpreting the panel data to determine if a finger touch has occurred, and if so, what the coordinates of the touch are. In order to do this, the firmware maintains a set of touch thresholds which are dynamically adjusted based on the current touch level and certain parameters which can be adjusted by the host.

According to one embodiment illustrated in FIG. 4, the ITO grid on touchscreen 90 comprises drive rows $20a$-$20i$ and sense columns $10a$-$10p$, where rows 20 are connected to drive signal lines and columns 10 are connected to sense lines. One configuration for routing ITO drive and sense lines to the AMRI-5000 chip is shown in FIG. 4.

Figure 5:
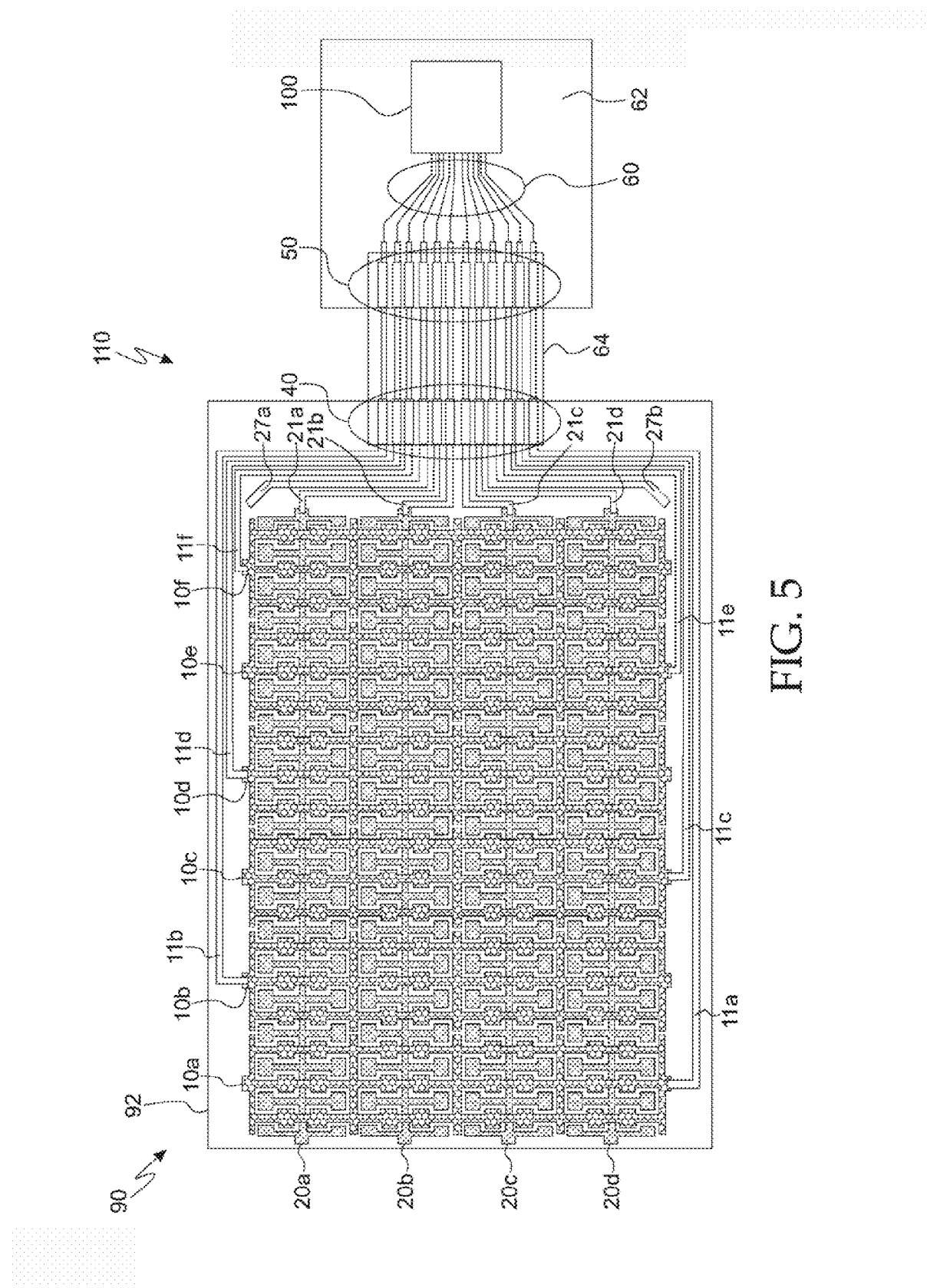
FIG. 5 shows one embodiment of capacitive sensing device 110.

Referring now to FIG. 5, there is shown capacitive touch sensing system 110 comprising mutual capacitance touchscreen 90, printed circuit board ("PCB") 90 or other suitable type of carrier having integrated circuit 100 mounted thereon or otherwise operably attached thereto, and flex circuit 64 which electrically connects PCB 62 and integrated circuit 100 to touchscreen 90. Touchscreen 90 comprises rows and columns of drive and sense electrodes $20a$ through $20d$, and $10a$ through $10f$, respectively, which according to various embodiments are formed atop or beneath touchscreen substrate 92, or between upper and lower layers forming substrate 92.

Continuing to refer to FIG. 5, integrated circuit 100 is mounted on PCB 62 or other suitable type of substrate. Integrated circuit 100 may be any one of a touchscreen controller, a micro-processor, an application specific integrated circuit ("ASIC"), CPU 100, or any other type of suitable controller or processor. Flex circuit 64 provides a means of joining PCB 62 to touchscreen dielectric substrate 92, which according to some embodiments comprises glass, plastic, PET plastic sheet, or any other suitable material. According to one embodiment, dielectric substrate 92 is substantially optically transparent or transmissive, and adapted to permit light emitted by underlying LCDs, LEDs or OLEDs to be transmitted upwardly therethrough. In other embodiments, dielectric substrate 92 is not optically transparent or transmissive. Not shown in FIG. 5 is a protective cover or dielectric plate that is typically disposed over touchscreen 90, and which is configured to protect touchscreen 90.

Still referring to FIG. 5, in one embodiment integrated circuit 100 is an Avago Technologies™ AMRI-5000 ASIC or chip 100, which is a low-power capacitive touch-panel controller designed to provide a touchscreen system with high-accuracy, on-screen navigation. Applications for the AMRI- 5000 chip include, but are not limited to, smart phones, portable media players, mobile internet devices (MIDs), and GPS devices, the data sheet for which is hereby incorporated by reference herein in its entirety. In one embodiment integrated circuit 100 is an AMRI-5000 touchscreen controller that includes an analog front-end with 4 drive signal lines and 6 sense lines connected to an ITO grid on a touchscreen (as shown in FIG. 5). The controller 100 applies an excitation square wave to the drive electrodes that may have a frequency selected from a range between about 40 kHz and about 200 kHz. The AC signal is coupled to the sense lines via mutual capacitance. Touching the panel 90 with a finger alters the capacitance at the location of the touch. Controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading.

The AMRI-5000 touchscreen controller 100 features multiple operating modes with varying levels of power consumption. In rest mode the controller periodically looks for touches at a rate programmed by the rest rate registers. There are multiple rest modes, each with successively lower power consumption. In the absence of a touch for a certain interval the controller 100 automatically shifts to the next-lowest power consumption mode. However, as power consumption is reduced the response time to touch increases.

The rest mode is a low power mode provided to save battery life. In rest mode, the device periodically looks for motion or touch at a rate programmed by rest rate registers and the responsiveness of the device is significantly reduced to save power. If the presence of a finger on the touchscreen is detected, the controller shifts to run mode. In the absence of finger detection for a predetermined period of time, the controller downshifts to the next slowest rest mode. Rest periods and downshift times are preferably programmable by firmware, and can be overridden via user register writes.

Those skilled in the art will understand that touchscreen controllers, micro-processors, ASICs or CPUs other than an AMRI-5000 chip may be employed in touchscreen system 110, and that different numbers of drive and sense lines, and different numbers and configurations of drive and sense electrodes, other than those explicitly shown herein may be employed without departing from the scope or spirit of the various embodiments of the invention.

Further according to one embodiment, capacitive touchscreen 90 is formed by applying a conductive material such as Indium Tin Oxide (ITO) to the surface(s) of dielectric plate or substrate 92, which typically comprises glass, plastic or other suitable dielectric or electrically insulative and preferably optically transmissive material, and which is usually configured in the shape of an electrode grid. The capacitance of the grid holds an electrical charge, and touching the panel with a finger presents a circuit path to the user's body, which creates a disruption. Integrated circuit 100 senses and analyzes the coordinates of these disruptions. When the touchscreen 90 is affixed to a display with a graphical user interface, on-screen navigation is possible by tracking the touch coordinates. The size of the grid is driven by the desired resolution of the touches. Typically there is an additional cover plate disposed over touchscreen 90 to protect the top layer of ITO layer disposed thereon. In another embodiment, the ITO is laid down on the underside of substrate 92, thereby obviating the need for a separate cover plate.

In some embodiments of touchscreen 90, a first layer of ITO comprising a first set of electrodes is laid down on substantially optically transparent or transmissive substrate 92 formed of, for example, glass or plastic, where the thickness of the ITO on such substrate is about 1 micron. Next, an electrically insulative layer comprising a substantially optically transparent or transmissive material such as a suitable polymer is laid over the first set of electrodes and has a thickness of about 2 microns. Then a second layer of ITO comprising a second set of electrodes is laid down atop the electrically insulative layer and is also about 1 micron thick, thereby forming a "single-layer" sensor array, where the sensor array is disposed on a single side of the substrate. The substrate is typically about 0.5 mm in thickness. In another embodiment, first and second layers of ITO are laid down on a single side of a substrate in the same plane, and cross-overs are employed to bridge between portions of the electrodes as required. See, for example, U.S. patent application Ser. No. 12/024,057 filed Jan. 31, 2008 to Harley et al. entitled "Single Layer Mutual Capacitance Sensing Systems, Devices, Components and Methods", the entirety of which is incorporated by reference herein, where examples of such crossovers and single-layer electrode configurations are disclosed, at least some of which may be employed in conjunction with the various embodiments described or shown herein. In still another embodiment, first and second layers of ITO are laid down on opposing sides of an electrically insulative substrate.

The various embodiments of touchscreen 90 disclosed herein, and the various embodiments of algorithms 300 through 309 depicted in FIGS. 11 through 15, operate in accordance with the principles of mutual capacitance. Capacitances are established between individual sense and drive electrodes by means of a drive waveform input to drive electrodes 20a through 20d. A user's finger is typically at or near electrical ground, and engages a touch surface that overlies touchscreen 90. When in contact with the touch surface, the user's finger couples to the drive signal provided by the drive electrode in closest proximity thereto and proportionately reduces the amount of capacitance between such drive electrode and its corresponding nearby sense electrode 10a through 10f. That is, as the user's finger moves across the touch surface, the ratio of the drive signal coupled to the respective individual sense electrodes 10a through 10f through the finger is reduced and varied, thereby providing a two-dimensional measurement of a position of the user's finger above touchscreen 90.

In such a manner, the capacitance at a single row-column intersection corresponding to the user's finger location is determined. By scanning all the rows and columns of touchscreen 90, a map of capacitance measurements may be created for all the nodes in the grid. Because each measurement probes only a single grid intersection point, no measurement ambiguities arise with multiple touches as in the case of some self-capacitance systems. A capacitive touchscreen system may also be configured to sense multiple touch locations in touchscreen 90 substantially simultaneously, and to that end a host computer may be updated at a rate that is quick enough to permit fast but not altogether "simultaneous" measurements such that all the rows and columns of touchscreen 90 are scanned sequentially to determine the position of any finger touches. More than one finger position can be detected if a quick enough update rate is employed, even though technically such positions are not actually measured simultaneously.

As further illustrated in FIG. 5, according to one embodiment of a capacitive sensing system there is provided capacitive sensing touchscreen 90 having columns of sense electrodes 10a, 10b, 10c, 10d, 10e and 10f, and rows of drive electrodes 20a, 20b, 20c and 20d. Integrated circuit 100 is configured to provide drive signals to rows of drive electrodes 20a through 20d through drive traces 21a, 21b, 21c and 21d, and to sense capacitively coupled signals resulting from the drive signals using columns of sense electrodes 10a through 10f through sense traces 11a, 11b, 11c, 11d, 11e and 11f. The configurations of rows and columns of electrodes shown in FIGS. 5 through 10 are provided primarily for illustrative purposes. In actual practice, more or fewer rows or columns of drive and sense electrodes may be provided. For example, in some commercial embodiments touchscreen 90 may comprise nine rows of drive electrodes and sixteen columns of sense electrodes, or eight rows of drive electrodes and twelve columns of sense electrodes.

Referring again to FIG. 5, first ends of drive traces 21a, 21b, 21c and 21d are connected to printed circuit board 62 through connections 40 and at second ends thereof to corresponding respective rows of drive electrodes 20a, 20b, 20c and 20d. As further shown in FIG. 5, first ends of sense traces 11a, 11b, 11c, 11d, 11e and 11f are connected to printed circuit board 62 through connections 40 and at second ends thereof to corresponding respective rows of sense electrodes 11a, 11b, 11c, 11d, 11e and 11f. The lengths of the traces connecting the sense and drive electrodes to integrated circuit 100 are preferably kept to a minimum so as to reduce the effects of parasitic capacitance. Accordingly, in one embodiment integrated circuit 100 is mounted directly on flex circuit 64, thereby reducing trace length. Note grounding traces 27a and 27b disposed on touchscreen substrate 92 between drive and sense traces 21a through 21d, and 11a through 11f, respectively, which help reduce excessive drive-sense coupling from occurring outside the sense area of touchscreen or panel 90.

Note that in the various embodiments illustrated in FIGS. 5 through 10 there are shown capacitive touchscreens or sensing devices 90 having six columns of sense electrodes and four rows of drive electrodes arranged at right angles respecting one another. It is to be understood, however, that other numbers of columns of sense electrodes, and other numbers of rows of drive electrodes, are specifically contemplated in the invention, and further that sense electrodes may be arranged in rows instead of columns, and that drive electrodes may be arranged in columns instead of rows. Moreover, the invention is not limited to embodiments where sense and drive electrodes intersect at 90 degree angles. Instead, any suitable angle between sense and drive electrodes may be employed.

As shown in FIG. 5, columns of sense electrodes 10a through 10f cross over rows of drive electrodes 20a through 20d at the locations where the columns and rows intersect. These intersection points or crossovers must be electrically insulated from one another with a suitable electrically insulative material for touchscreen 90 to operate. When crossovers are employed, drive and sense electrodes 20a through 20d, and 10a through 10f, respectively, can be arranged in a matrix formed in a single layer of ITO. Alternatively, drive and sense electrodes 20a through 20d, and 10a through 10f, respectively, may be disposed in substantially parallel planes that are vertically offset from one another by a layer of electrically insulative material, such as a suitable electrically insulative polymer, glass or plastic, in which event no crossovers are required. In either embodiment, the overall electrode pattern is optimized such that coupling across an in-plane gap is maximized, and coupling where sense and drive lines cross is minimized. An optical electrode pattern may contain more interlacing of drive and sense lines than that shown in FIG. 5 to increase the ratio of useful capacitance as opposed to parasitic capacitance. (Any capacitance that is not changed by the presence of a finger is considered to be parasitic, while any capacitance that is changed by the presence of a finger is considered to be useful.)

Figure 6:
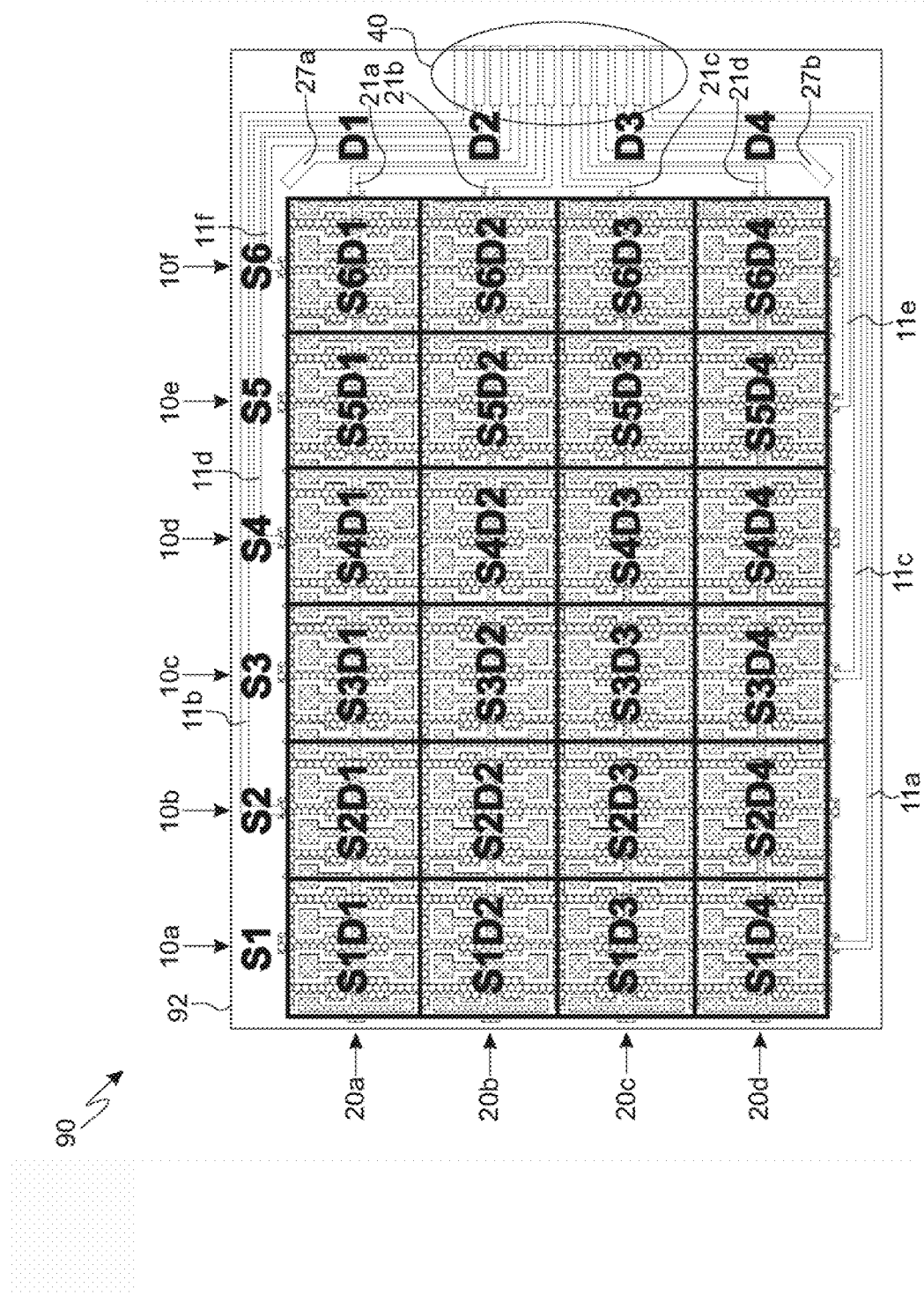
FIG. 6 shows one embodiment of cells S1D1 through S6D4 corresponding to capacitive sensing device 110 of FIG. 1.
Figure 7:
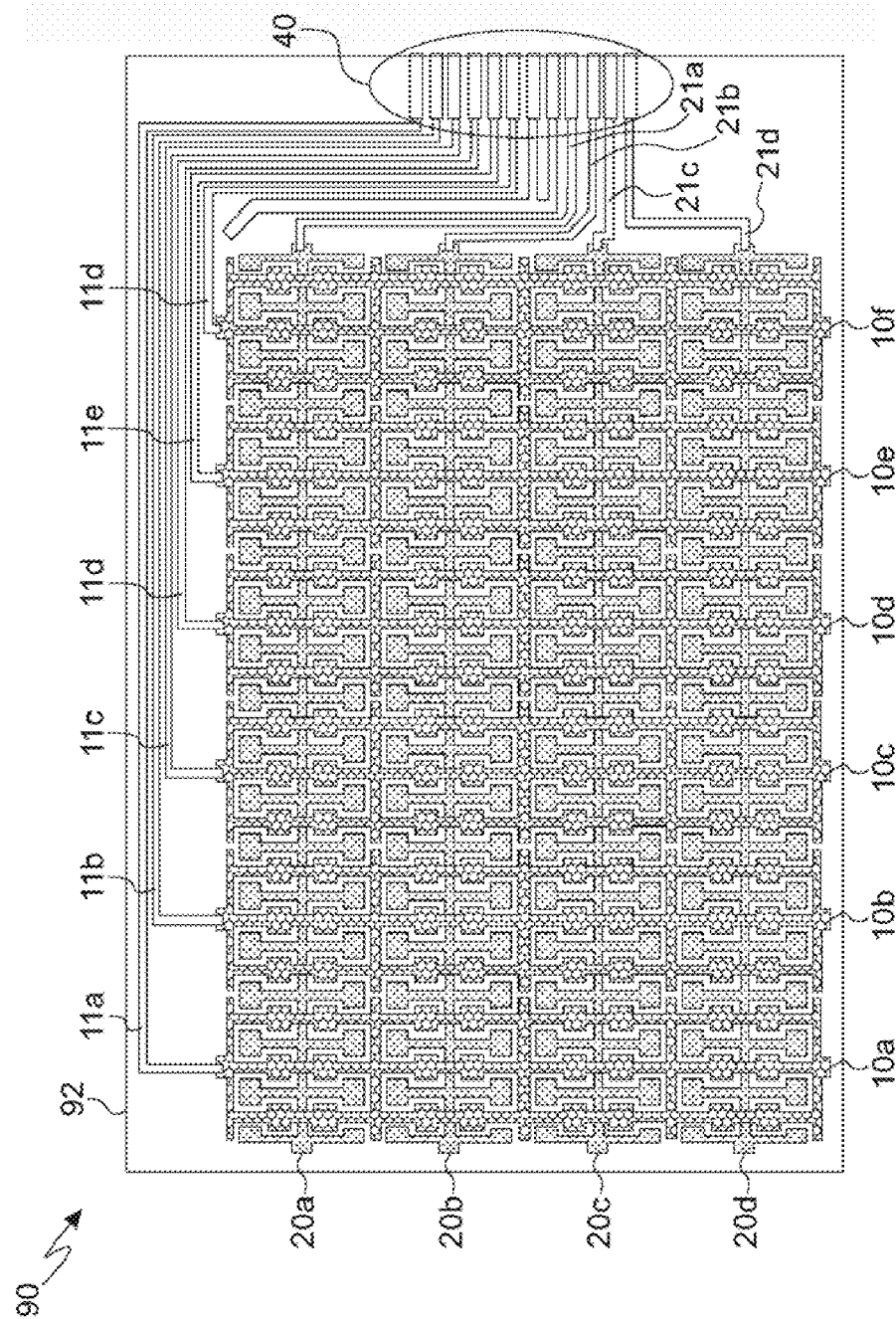
FIG. 7 shows one embodiment of a touchscreen 90 having non-interleaved sense electrodes 10a through 10f.
Figure 8:
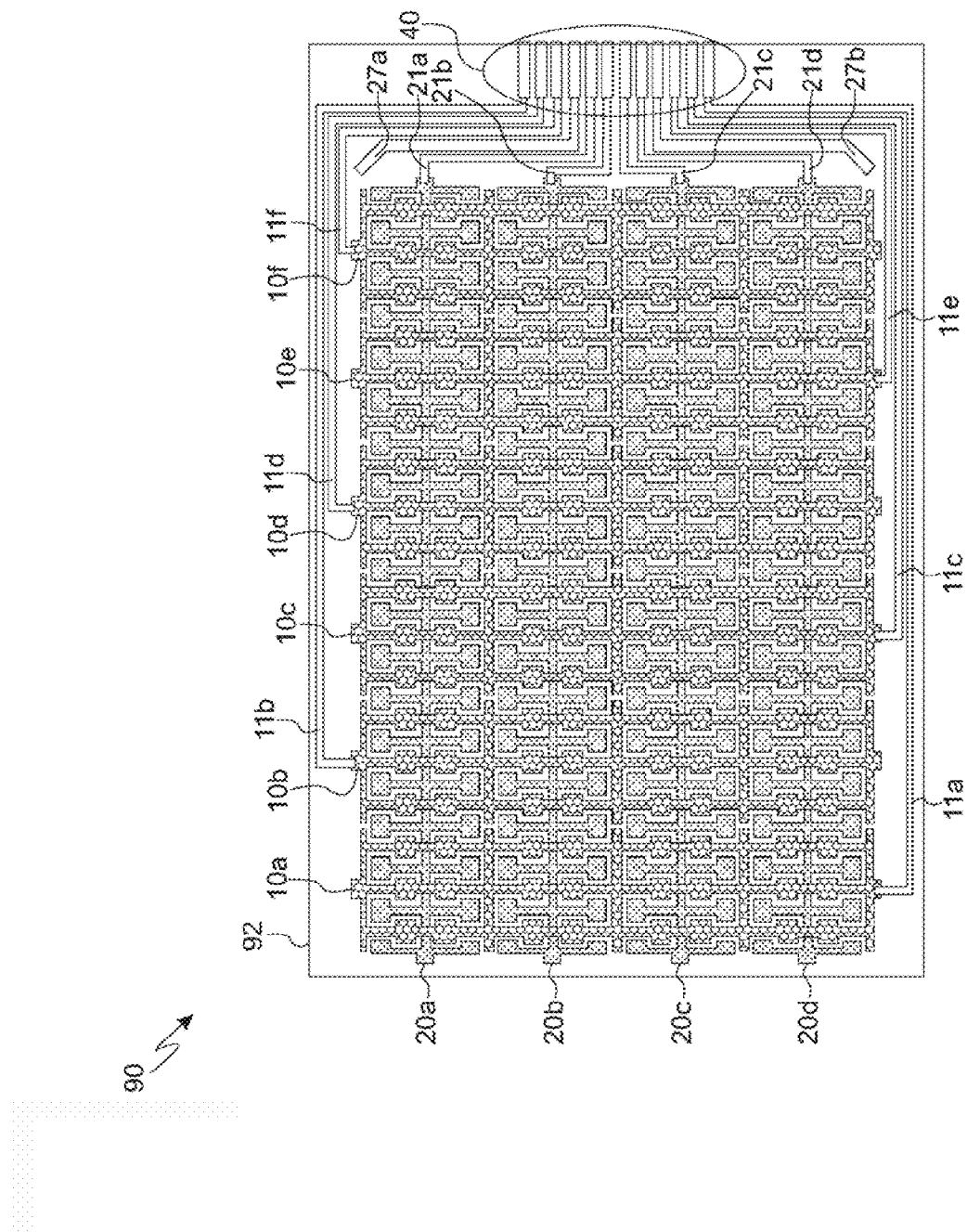
FIG. 8 shows one embodiment of a touchscreen 90 having interleaved sense electrodes 10a through 10f.
Figure 9:
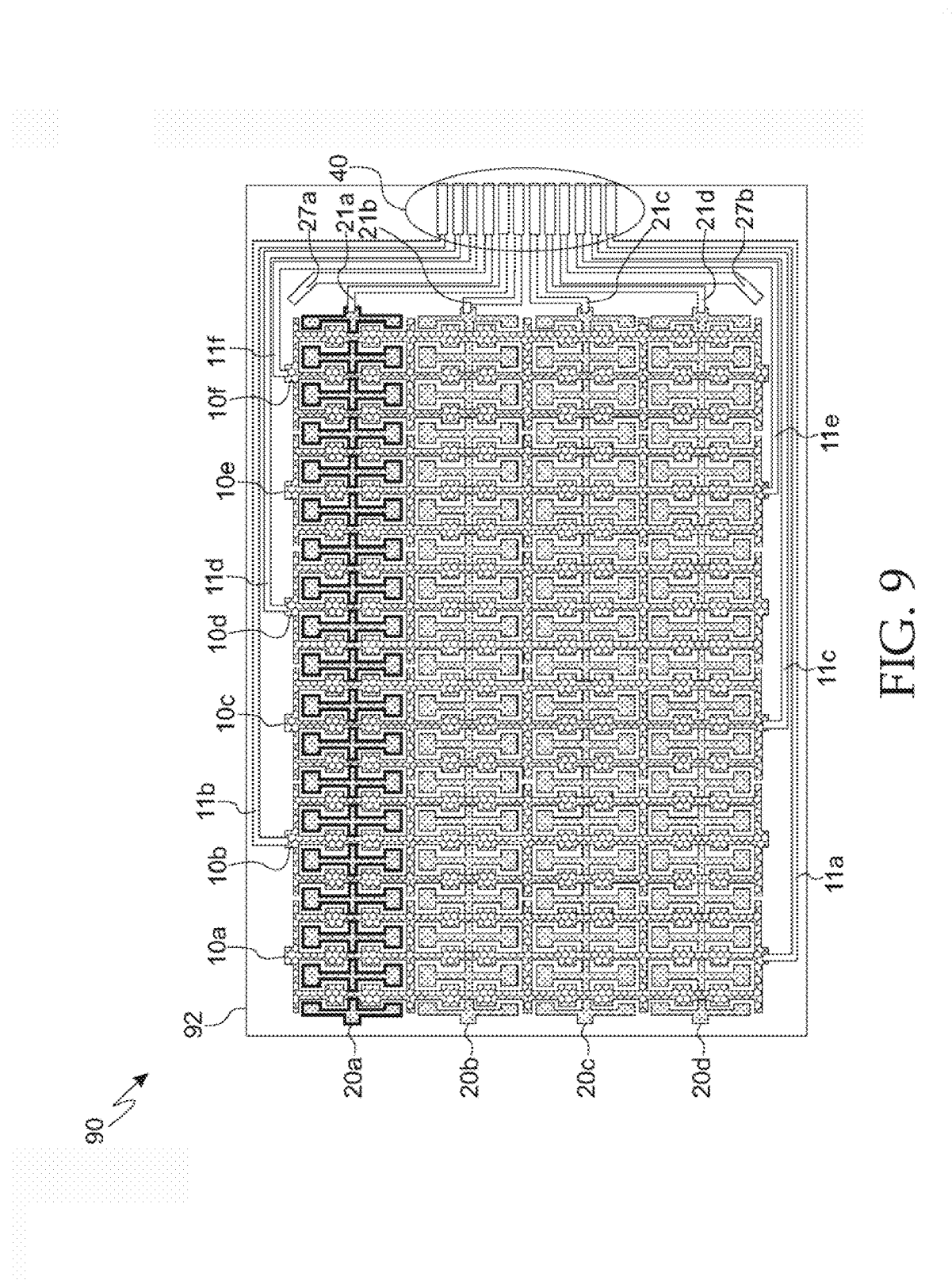
FIG. 9 shows one embodiment of a touchscreen 90 having interleaved sense electrodes 10a through 10f with drive row 20a highlighted.
Figure 10:
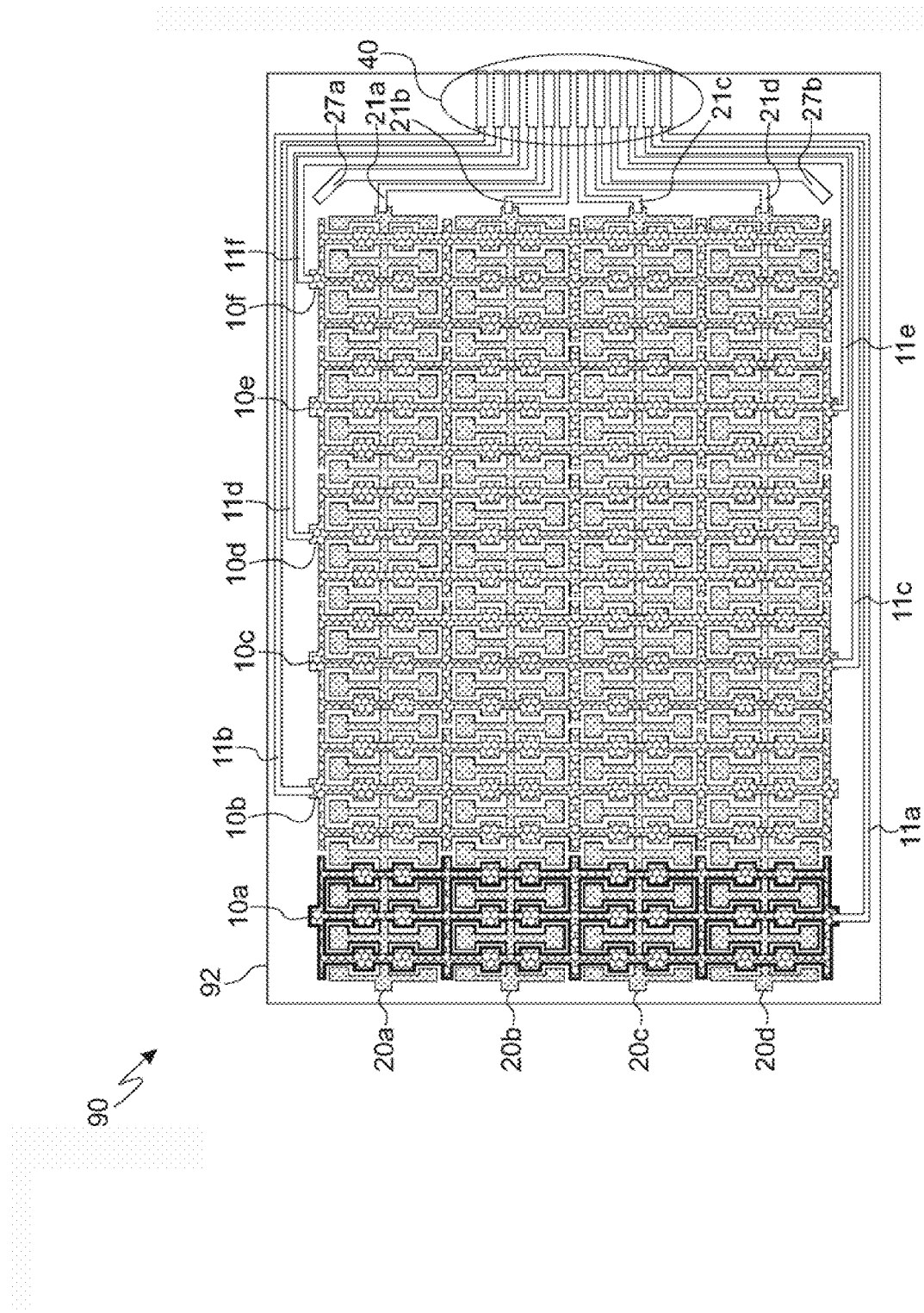
FIG. 10 shows one embodiment of a touchscreen 90 having interleaved sense electrodes 10a through 10f with sense column 10a highlighted.

Referring now to FIG. 6, according to the various embodiments of the invention detecting shorted, broken or otherwise defective ITO electrode or routing traces relies on detecting changes or similarities, as the case may be, between capacitances sensed in neighboring or adjoining portions or cells of touchscreen 90. As shown in FIG. 6, each area where a column crosses a row (or vice versa) designates a cell in touchscreen 90. Thus, in the area of touchscreen 90 where sense column S1 (or column 10a) intersects drive electrode D1 (or 20a), the corresponding cell is designated S1D1. In the area of touchscreen 90 where sense column S6 (or column 10f) intersects drive electrode D4 (or 20d), the corresponding cell is designated S6D4. Under optimal conditions where no defects are present in the ITO that has been employed to form the sense and drive electrodes of touchscreen 90, changes in sensed capacitance should vary gradually across touchscreen 90 due to gradually increasing electrical resistances associated with lengthening traces of ITO. Any sudden difference in signal level or sensed capacitance between neighboring or adjoining cells may indicate a sudden increase in impedance, which may be caused by a break in the ITO forming an electrode or routing trace, or a defect such as the ITO being too thin. A lack of expected difference in signal level or sensed capacitance between neighboring rows or columns may indicate a possible short, either in the ITO employed to form the electrode trace, or in the routing traces leading to the electrode trace.

A touchscreen 90 of given electrode geometry and layout, and which is known to be free of ITO trace defects, can be employed to derive or measure nominal or expected variations in signal level or sensed capacitance over touchscreen 90 in respect of cell location. Such measured or derived values can then be employed to formulate or determine predetermined thresholds that can be used to distinguish good traces from bad traces according to cell location for a touchscreen of a given design. Those skilled in the art will understand the values of such thresholds depend upon a number of factors, such as the lengths, widths and thicknesses of the various ITO traces employed to form touchscreen 90, the number of traces, the particular formulation employed to form the ITO material itself, spacing between adjoining electrodes, the number of sense and drive electrodes, ambient temperature, ambient humidity, and many other factors. As a result, the particular values of the predetermined thresholds and their corresponding cells will vary according to the particular touchscreen design that is at hand.

According to one embodiment the signal levels or sensed capacitance values that have been measured for each cell location can be employed to determine the location of defective traces. Generally, however, differences between such signal levels or sensed capacitance values in adjoining or neighboring cells reveal changes indicative of the presence of defective traces better than looking at the individual values themselves. Thus, in one embodiment, the signal levels or sensed capacitance values corresponding to pairs or other combinations of neighboring cells are compared both horizontally and vertically to detect abrupt changes or unexpected similarities in signal level.

According to another embodiment, the measured value corresponding to each cell is compared with the values corresponding to up to eight adjoining cells sharing corners and common sides, where each edge cell has five adjoining cells sharing corners and common sides, and each corner cell has three adjoining cells sharing corners and common sides. By adjoining cells we mean cells sharing common sides as well as having corners that touch on the diagonal. Thus, and referring to FIG. 6, cell S3D2 shares common sides with cells S3D1, S4D2, S3D3 and S2D2, and shares corners with cells S4D1, S4D3, S2D3 and S2D1. All eight such cells "adjoin" cell S3D2.

In yet another embodiment, the measured value corresponding to each cell is compared with the values corresponding to up to four neighboring cells sharing common sides, where each edge cell has three neighboring cells sharing common sides, and each corner cell has two neighboring cells sharing common sides (see FIG. 6). By neighboring cells we mean cells sharing common sides only. Thus, and referring to FIG. 6, cell S3D2 shares common sides with cells S3D1, S4D2, S3D3 and S2D2. All four such cells "neighbor" cell S3D2.

Note that adjoining or neighboring cells, or any suitable combination of adjoining and neighboring cells, can be compared according to the various embodiments of the invention to determine the locations of defective traces. Comparison of sensed values corresponding to neighboring cells generally provides results superior to those provided by adjoining cells, however.

Continuing to refer to FIG. 6, and in a preferred embodiment, along each of drive electrode rows or axes 20a through 20d, each neighboring cell is compared with the previous and next neighboring cells, unless the current cell being evaluated is an edge cell. So, for example, S3D2 is compared with S3D1 and S3D3. Along each of sense electrode columns or axes 10a through 10f the measured value comparisons carried out depend on the particular touchscreen or electrode layout that is at hand.

In the case of a panel with all sense lines routed from the same side of touchscreen 90 (see, for example, FIG. 7), the measured value of each cell is compared with those of its immediate neighbors, and so for example the measured value of S3D2 is compared with the measured values of S2D2 and S4D2. In a non-interleaved system such as that shown in FIG. 7, sense lines are all routed along one side of the panel. In this case the signal on each sense line is similar to the one next to it.

In the case of a panel with interleaved sense electrodes (see, for example, FIG. 8), where sense electrode columns are routed from opposing sides of touchscreen 90, even and odd sense columns lines may be compared such that, for example, the measured value of S3D2 is compared with the measured values of S1D2 and S5D2. In an interleaved sense electrode system, odd-numbered sense lines are routed along one edge of panel 90 and even-numbered lines are routed along the opposing side of panel 90. This may result in odd-numbered sense lines yielding measured values that are more similar to the next odd sense line over, rather than the next sense line over, which is even-numbered. Consequently, and by way of example, the third sense line may yield measured values more similar to those of the fifth sense line than those corresponding to the fourth sense line.

The required measured value comparisons can be done by stepping through the arrays of cells twice, first according to drive axes and second according to sense axes (or vice-versa). In the case of a non-interleaved sense electrode panel (see FIG. 7), in the first row the measured value of S1D1 is compared to the measured value of S2D1, which is then compared to the measured value of S3D1, on through to the measured value of S6D1. The measured values corresponding to the remaining rows are then processed in the same fashion. See the flowchart of FIG. 12 (open test by row, non-interleaved sense electrodes). Next the process is repeated by column, where for example the measured value of S1D1 is compared to the measured value of S1D2, the measured value of S1D2 is compared to the measured value of S1D3, and so on. See the flowchart of FIG. 11 (open test by column, non-interleaved sense electrodes).

In an interleaved sense electrode panel, in the first row, by way of example, the measured value of S1D1 is compared to the measured value of S3D1, which is then compared to the measured value of S5D1, followed by comparing the measured value of S2D1 to the measured value of S4D1. The measured value of S4D1 is then compared to the measured value of S6D1. The remaining rows are processed in the same fashion. See the flowchart of FIG. 13 (open test by row—interleaved sense electrodes). Next the process is repeated by column, where for example the measured value of S1D1 is compared to the measured value of S1D2, and the measured value of S1D2 is compared to the measured value of S1D3, and so on (this part of the method is the same regardless of the interleaving of sense electrodes; see the flowchart in FIG. 11).

Shorted lines can be detected by comparing the measured values of entire drive rows to the measured values of neighboring cells, or by comparing the measured values of sense columns with neighboring cells (or the cells the next column over, depending on whether the panel or touchscreen contains interleaved or non-interleaved columns of sense electrodes). If the differences in measured values of the two rows or columns are too similar, an electrical short between them may exist. See the flowcharts in FIGS. 13 and 14.

In the cases described above, neighboring cells are expected to have similar measured values (in the non-interleaved sense electrode case) or every other cell is expected to have similar values (in the interleaved sense electrode case). If a layout different from those described above is employed, a different pattern of similar cell measured values should be expected. In such a case, the method is modified to compare cells expected to have similar values.

Figure 11:
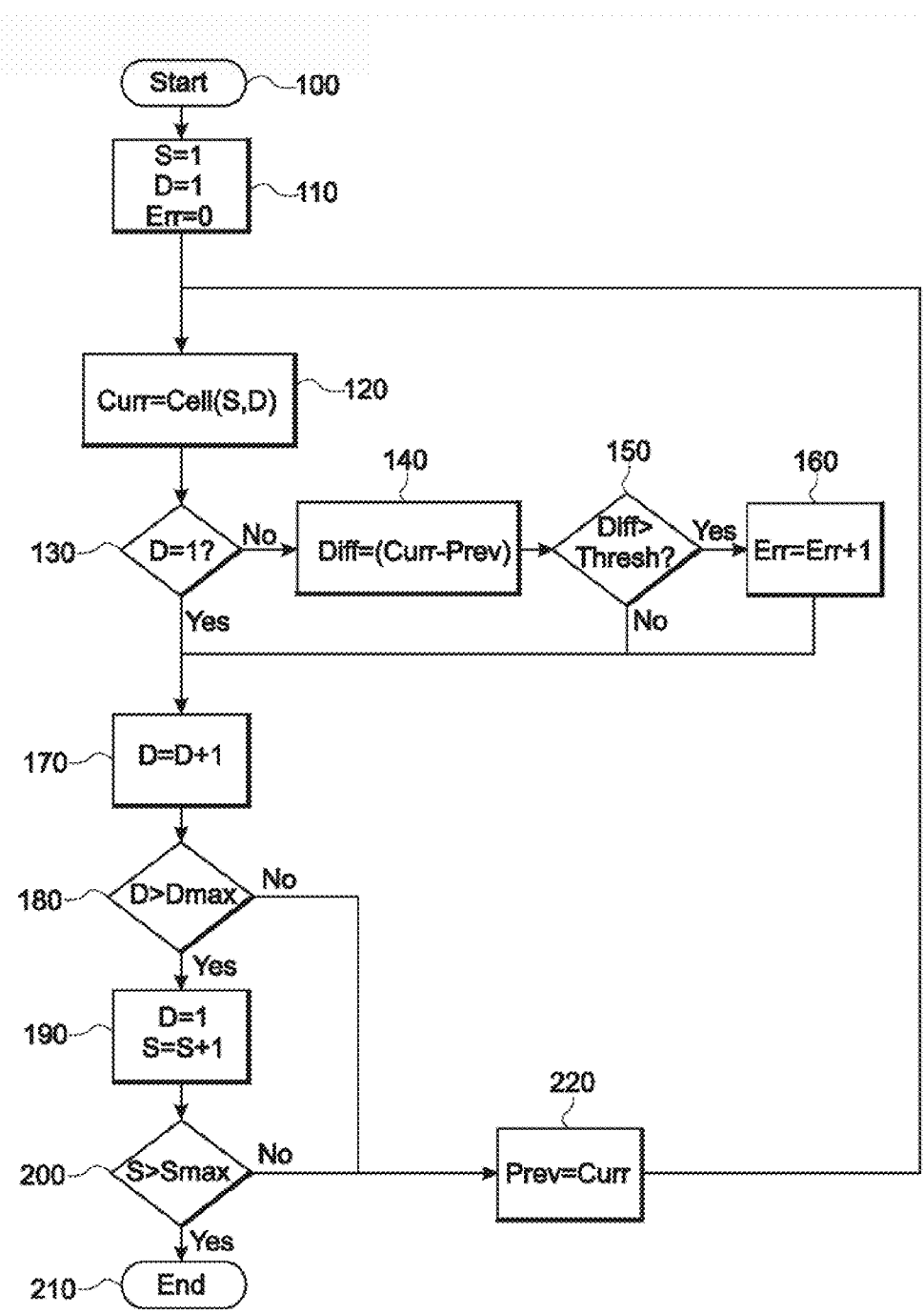
FIG. 11 shows one embodiment of algorithm 300 for cell test by column with non-interleaved sense electrodes.

Referring now to the flowchart of FIG. 11, there is shown one embodiment of algorithm 300 for comparing the measured values of cells in touchscreen or panel 90 according to an open-test-by-column, non-interleaved sense electrode method. The non-interleaved sense electrode "Cell Test by Column" algorithm represented by steps 100 through 220 in FIG. 11 cycles through the individual cells in touchscreen 90 first by drive line and then by sense line (e.g., the cells are evaluated in the order S1D1, S1D2, S1D3, S1D4, S2D1, etc., up to cell S6D4). For each cell other than the first cell in each drive row, the measured signal level corresponding thereto is compared to the measured signal level corresponding to the previous cell in the same row. If the difference between the two measured signal levels is greater than a predetermined threshold of the touchscreen location corresponding to the two cells, the error count is incremented. If at step 210 the error count is greater than zero, the defective trace test has failed. The value of the final error count gives a rough idea of how serious the failure is. An error count of one may mean that one trace location on touchscreen or panel 90 is defective, while an error count of two may mean that two trace locations on touchscreen or panel 90 are defective. It is to be noted, however, that the final error count does not necessarily correspond to the actual number of trace defects on panel 90, since some defects may be counted more than once. Those skilled in the art will understand that algorithm 300 depicted in FIG. 11 may be expanded to permit the detection of shorted traces between adjoining columns or rows of electrodes, or cells, where predetermined thresholds corresponding to different cell locations of touchscreen or panel 90 exceed differences calculated for neighboring or adjoining rows, columns or cells.

Figure 12:
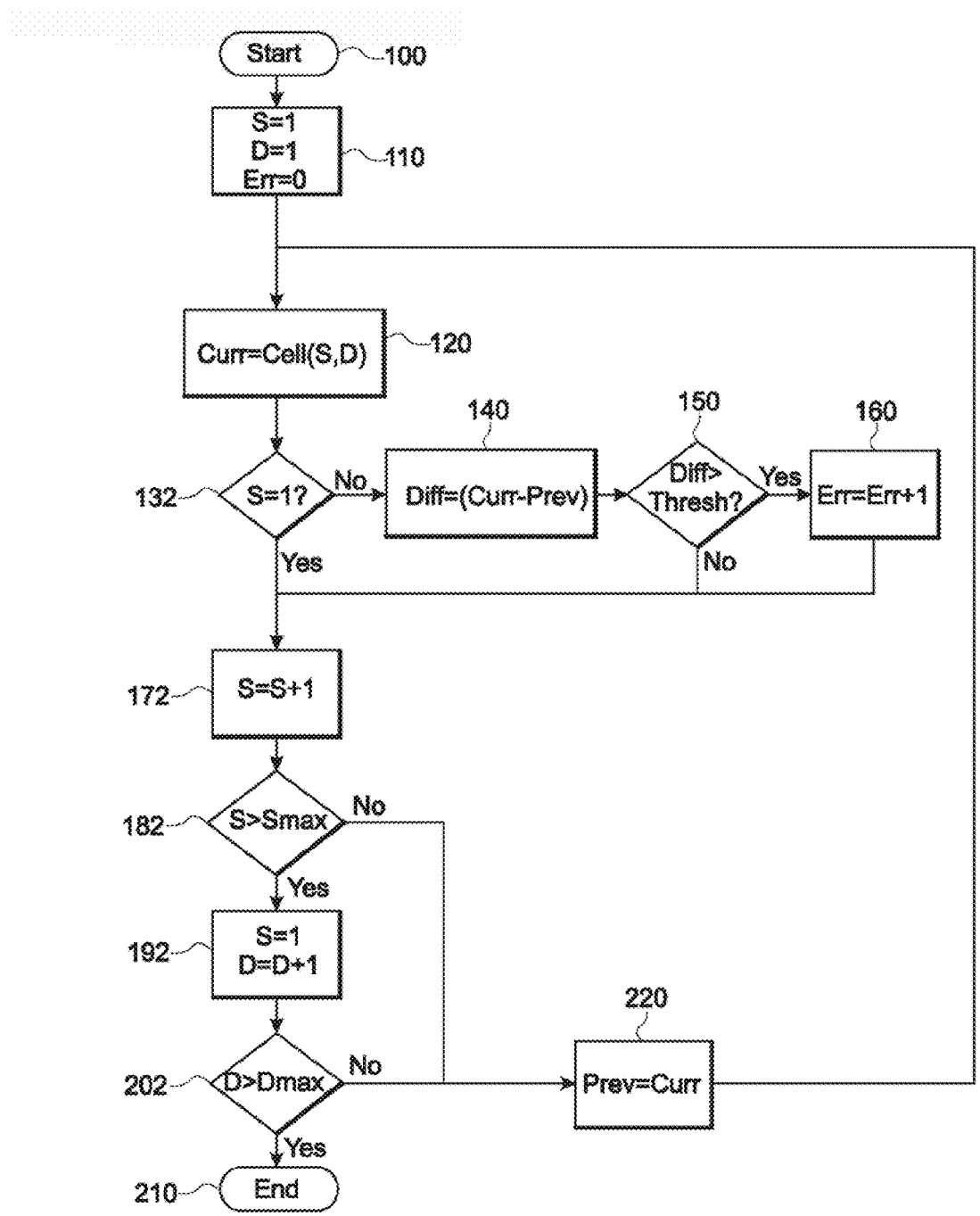
FIG. 12 shows one embodiment of algorithm 302 for cell test by row with non-interleaved sense electrodes.

Referring now to the flowchart of FIG. 12, there is shown one embodiment of algorithm 302 for comparing the measured values of cells in touchscreen or panel 90 according to an open-test-by-row, non-interleaved sense electrode method. The non-interleaved sense electrode "Cell Test by Row" algorithm represented by steps 100 through 220 in FIG. 12 cycles through the individual cells of touchscreen or panel 90 first by sense line and then by drive line (e.g., cells are evaluated in the order S1D1, S2D1, S3D1, . . . , S1D2, S2D2, S3D3, and so on). For each cell other than the first cell in each sense column, the measured signal level corresponding thereto is compared to the measured signal level of the previous cell in the same column. If the difference between the two measured signal values is greater than a predetermined threshold of the touchscreen location corresponding to the two cells, the error count is incremented. If at step 210 the error count is greater than zero, the defective trace test has failed. As described above, the value of the final error count gives a rough idea of how serious the failure is and does not necessarily correspond to the actual number of trace defects on panel 90. Those skilled in the art will understand that algorithm 302 depicted in FIG. 12 may be expanded to permit the detection of shorted traces between adjoining columns or rows of electrodes, or cells, where predetermined thresholds corresponding to different cell locations of touchscreen or panel 90 exceed differences calculated for neighboring or adjoining rows, columns or cells.

Figure 13:
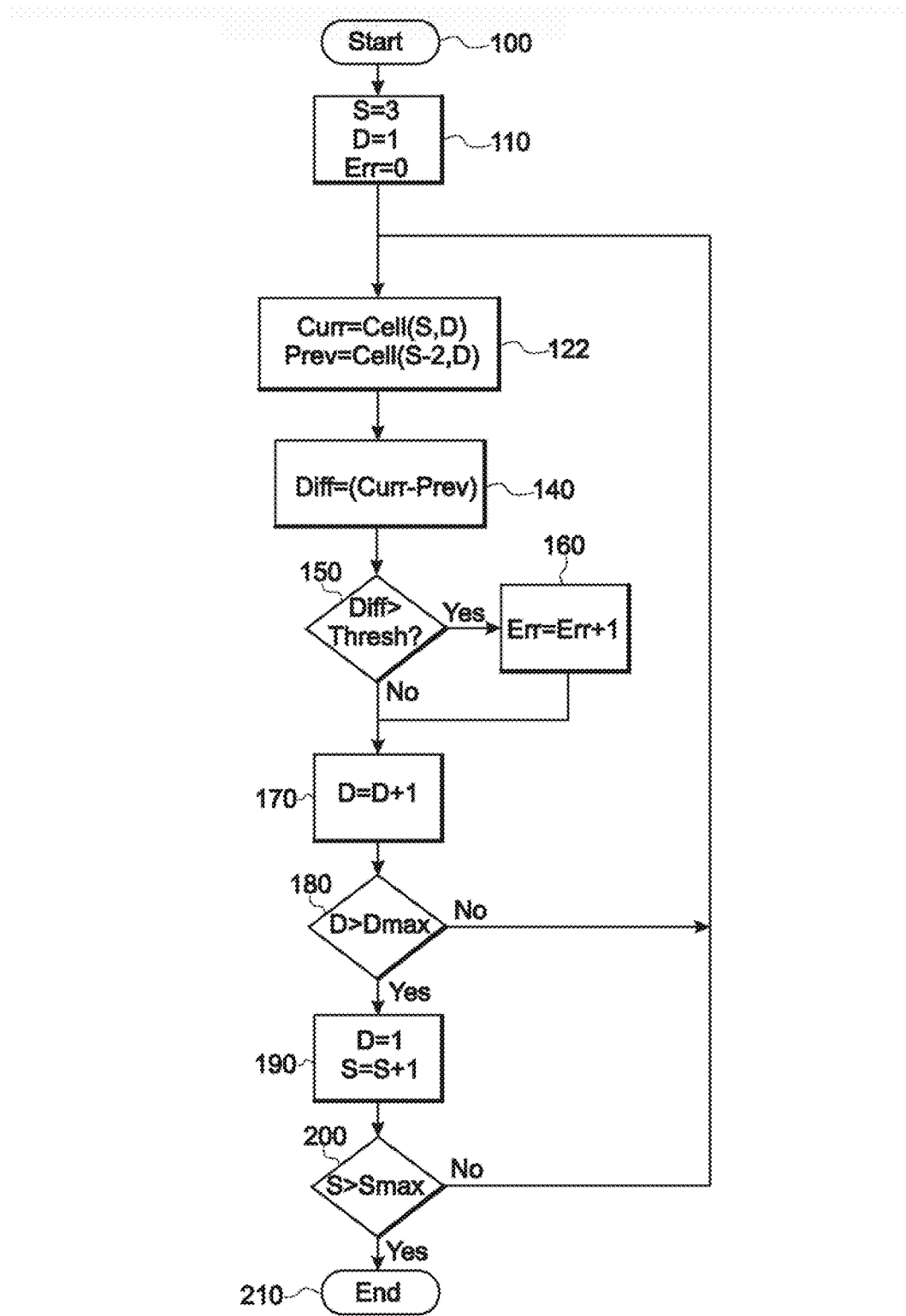
FIG. 13 shows one embodiment of algorithm 304 for cell test by row with interleaved sense electrodes.

Referring now to the flowchart of FIG. 13, there is shown one embodiment of algorithm 304 for comparing the measured values of cells in touchscreen or panel 90 according to an open-test-by-row, interleaved sense electrode method. Interleaved sense electrode "Cell Test by Row" algorithm 304 represented by steps 100 through 210 in FIG. 13 cycles through individual cells first by drive line and then by sense line, starting with third sense line 10c (e.g., cells are evaluated in the order S3D1, S3D2, S3D3, S3D4, S4D1, etc). For each cell the measured signal levels corresponding to the two neighboring columns corresponding thereto are compared. Thus, for example, the measured value of S3D1 is compared to the measured value of S1D1, and so on. If the difference between the two measured signal levels is greater than a predetermined threshold of the touchscreen location corresponding to the two cells, the error count is incremented. If at step 210 the error count is greater than zero, the defective trace test has failed. As described above, the value of the final error count gives a rough idea of how serious the failure is and does not necessarily correspond to the actual number of trace defects on panel 90. Those skilled in the art will understand that algorithm 304 depicted in FIG. 13 may be expanded to permit the detection of shorted traces between adjoining columns or rows of electrodes, or cells, where predetermined thresholds corresponding to different cell locations of touchscreen or panel 90 exceed differences calculated for neighboring or adjoining rows, columns or cells.

Figure 14:
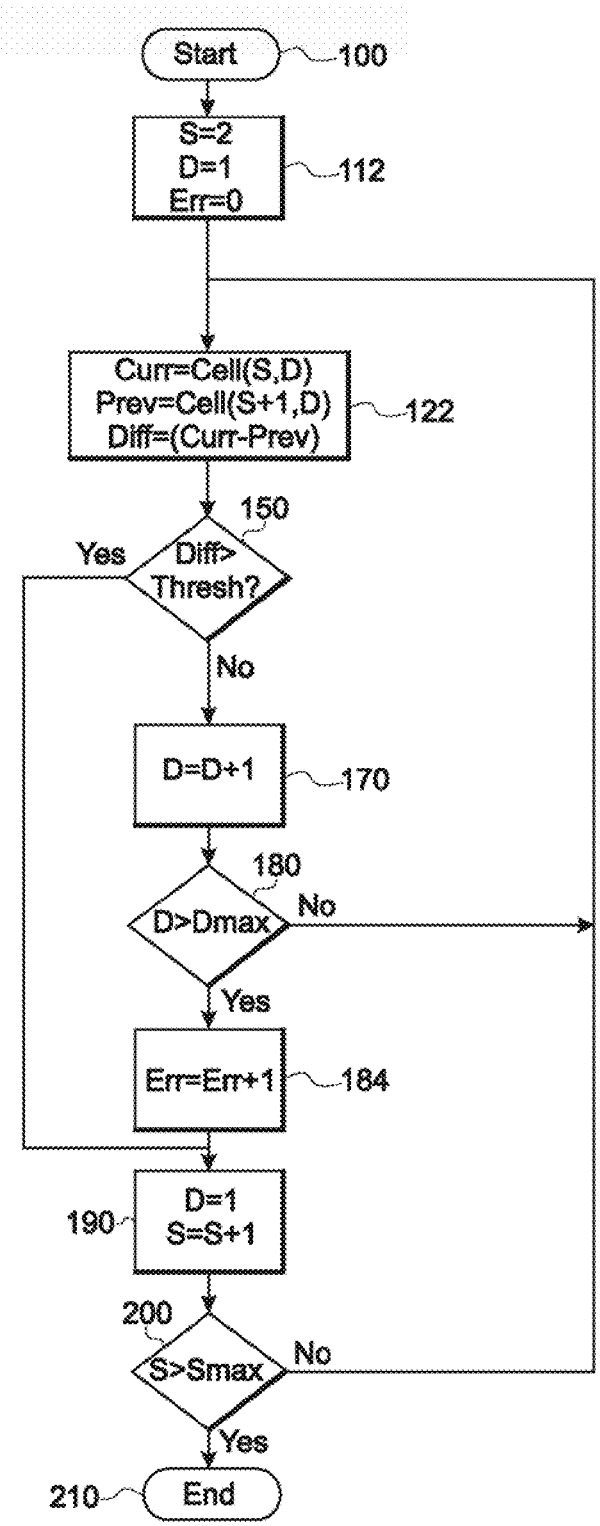
FIG. 14 shows one embodiment of algorithm 306 for short test by column.

Referring now to the flowchart of FIG. 14, there is shown one embodiment of algorithm 306 for comparing the measured values of columns of cells in touchscreen or panel 90 according to a short-test-by-column method. Short-test-by-column algorithm 306 represented by steps 100 through 210 in FIG. 14 compares the measured values of neighboring columns of cells. If the measured values of all the cells in one column are very similar or close to those in a neighboring column, the error counter is incremented. That is, if the measured values of all the cells in a given column are nearly identical to those of a neighboring column, then the two columns are very likely to be electrically shorted to one another. By way of example, the measured values of second sense column 10b (S2) are compared with those of neighboring column S1, where the measured value of each cell in column S2 is compared with corresponding measured values in column S1 for the same drive line. If adjoining cells in the same row has measured values that differ by more than a predetermined threshold (diff>thresh), the process moves on to the next sense column. If the end of a sense column is reached without finding any significant differences exceeding the predetermined thresholds corresponding to the cell locations that have been analyzed, the error count is incremented and the next column is evaluated. If the entire panel 90 is tested without the error count being incremented, there are likely no shorted columns in panel 90. Those skilled in the art will understand that algorithm 306 depicted in FIG. 14 may be expanded to permit the detection of broken or otherwise defective traces between adjoining columns or rows of electrodes, or cells, where predetermined thresholds corresponding to different cell locations of touchscreen or panel 90 exceed differences calculated for neighboring or adjoining rows, columns or cells, or to test for shorted rows.

Figure 15:
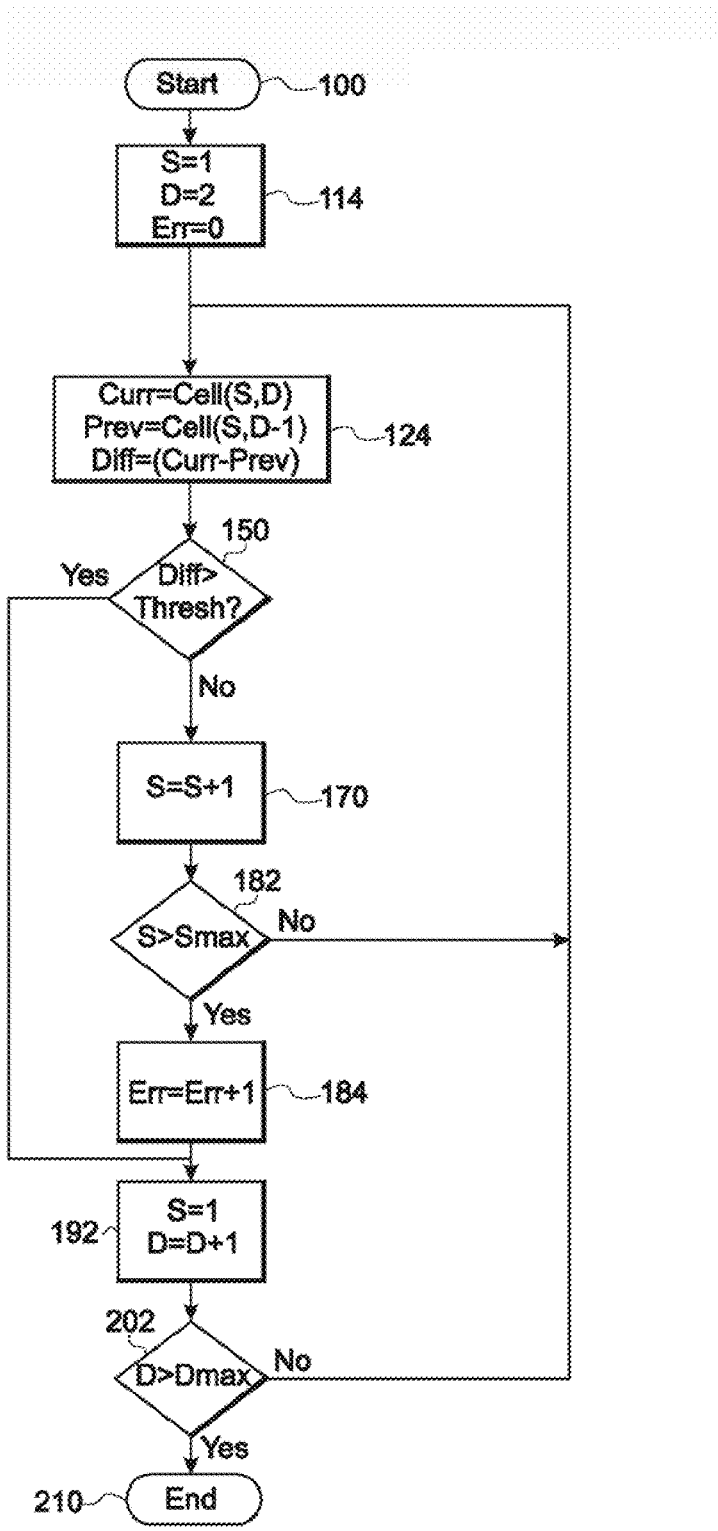
FIG. 15 shows one embodiment of algorithm 308 for short test by row.

Referring now to the flowchart of FIG. 15, there is shown one embodiment of algorithm 308 for comparing the measured values of rows of cells in touchscreen or panel 90 according to a short-test-by-row method. Short-test-by-row algorithm 306 represented by steps 100 through 210 in FIG. 15 compares the measured values of neighboring rows of cells. If the measured values of all the cells in one row are very similar or close to those in a neighboring row, the error counter is incremented. That is, if the measured values of all the cells in a given row are nearly identical to those of a neighboring row, then the two rows are very likely to be electrically shorted to one another. By way of example, the measured values of second drive row 20b (D2) are compared with those of neighboring row D1, where the measured value of each cell in row D2 is compared with corresponding measured values in row D1 for the same column line. If adjoining cells in the same column have measured values that differ by more than a predetermined threshold (diff>thresh), the process moves on to the next drive row. If the end of a drive row is reached without finding any differences exceeding the predetermined thresholds corresponding to the cell locations that have been analyzed, the error count is incremented and the next row is evaluated. If the entire panel 90 is tested without the error count being incremented, there are likely no shorted rows in panel 90. Those skilled in the art will understand that algorithm 308 depicted in FIG. 15 may be expanded to permit the detection of broken or otherwise defective traces between adjoining columns or rows of electrodes, or cells, where predetermined thresholds corresponding to different cell locations of touchscreen or panel 90 exceed differences calculated for neighboring or adjoining rows, columns or cells, or to test for shorted columns.

Those skilled in the art will now understand that a virtually infinite number of different additions to, or combinations, permutations or modifications of, the steps included in algorithms 300 through 308 may be made without departing from the spirit and scope of the various embodiments of the invention. According to one embodiment, and with the aid of the information presented above and that depicted in FIGS. 11 through 15, processor 100 is programmed or otherwise configured in a manner those skilled in the art will understand to execute a suitable algorithm for testing touchscreen 90 for defective traces. The algorithm may be implemented in machine language or code, or any other suitable means, and stored in a machine readable volatile or non-volatile memory of processor 100 such as EEPROM or RAM. Moreover, such an algorithm may be executed in the field in a portable or other electronic device having touchscreen 90 incorporated therein, or may be executed in a manufacturing facility before such a device is shipped, to confirm proper operation of touchscreen 90.

Those skilled in the art will understand that touchscreen 90 may be employed or incorporated into a number of different devices, including, but not limited to, an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device or a household appliance.

Note further that the various teachings presented herein may be applied to optically transmissive or non-optically-transmissive touchpads disposed, for example, on a printed circuit board, a flex circuit or board, or any other suitable substrate that may be incorporated into any of the above-described electronic devices.

While the primary use of capacitive touchscreen 90 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, the invention is not limited in scope to drive electrodes disposed in rows and sense electrodes disposed in columns. Instead, rows and columns are interchangeable in respect of sense and drive electrodes.

Note further that included within the scope of the present invention are methods of making and having made the various components, devices, systems and methods described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A method of testing a mutual capacitance sensing device, comprising:
    applying a drive signal to a first row or column of drive electrodes from among a plurality of drive electrodes arranged substantially parallel to one another;
    measuring respective relative mutual capacitances generated by the drive signal using a plurality of columns or rows of sense electrodes which intersect the rows or columns of drive electrodes at an angle, the columns or rows of sense electrodes being arranged substantially parallel to one another;
    associating the measured respective relative mutual capacitances with cells corresponding to intersecting drive and sense electrode locations;
    determining differences between the measured relative capacitances of adjoining cells;
    determining whether any of the differences exceed or fall below predetermined thresholds corresponding thereto, and
    identifying one or more defective traces on the basis of the differences exceeding or falling below the predetermined thresholds.

2. The method of claim 1, further comprising sequentially measuring the respective relative mutual capacitances in the plurality of columns or rows of sense electrodes.

3. The method of claim 1, further comprising further identifying locations of one or more defective traces corresponding to one or more of the cells in the capacitive sensing device.

4. The method of claim 1, further comprising comparing measured capacitances of pairs of neighboring cells to one another and determining the respective differences therebetween.

5. The method of claim 1, further comprising determining whether any differences in measured capacitance fall below predetermined thresholds corresponding thereto, thereby indicating shorted traces.

6. The method of claim 1, further comprising determining whether any differences in measured capacitance fall above predetermined thresholds corresponding thereto, thereby indicating broken traces.

7. The method of claim 1, wherein the angle between the rows and columns of drive electrodes and the columns or rows of sense electrodes is about 90 degrees.

8. The method of claim 1, wherein the mutual capacitance sensing device is a touchscreen.

9. The method of claim 1, wherein the mutual capacitance sensing device is a touchpad.

10. The method of claim 1, wherein the sense electrodes are interleaved.

11. The method of claim 1, wherein the sense electrodes are non-interleaved.

12. The method of claim 1, wherein the method is carried out during a process of manufacturing the device.

13. The method of claim 1, wherein the method is carried out after the device has been incorporated into an electronic device.

14. The method of claim 1, wherein the method is carried out in the field.

15. The method of claim 1, wherein the sense and drive electrodes are disposed in substantially parallel but vertically-offset first and second planes, respectively.

16. The method of claim 1, wherein the sense and drive electrodes comprise indium tin oxide ("ITO").

17. The method of claim 1, wherein the drive and sense electrodes form a 9×16 sensor array or an 8×12 sensor array.

18. The method of claim 1, further comprising disposing a liquid crystal display beneath the sensing device.

19. The method of claim 1, wherein the drive and sense electrodes are disposed on a substrate comprising an electrically insulative material.

20. The method of claim 19, wherein the substrate is substantially optically transparent.

21. The method of claim 1, wherein the method is carried out using an integrated circuit having steps corresponding thereto stored in a machine readable medium thereof.

22. The method of claim 1, further comprising incorporating the sensing device into an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device and a household appliance.

23. A method of testing a mutual capacitance sensing device for defective traces, comprising:
applying a drive signal to a first row or column of drive electrodes;
measuring, in at least first and second columns or rows of sense electrodes arranged at an angle with respect to the first row or column, first and second capacitances resulting from the drive signal being applied to the first row or column, the first and second columns and rows being arranged substantially parallel to one another;
applying the drive signal to a second row or column of drive electrodes arranged substantially parallel to the first row or column;
measuring, in the first and second columns or rows of sense electrodes, third and fourth capacitances resulting from the drive signal being applied to the second row or column, the first, second, third and fourth measured capacitances corresponding to respective first, second, third and fourth cells in the sensing device;
determining, for adjoining cells, differences between measured capacitances, and
determining whether any of the differences exceed or fall below predetermined thresholds corresponding to the first, second, third or fourth cells, thereby indicating the presence of one or more defective traces in or near such cells.

24. The method of claim 23, further comprising sequentially measuring the respective relative mutual capacitances in the plurality of columns or rows of sense electrodes.

25. The method of claim 23, further comprising further identifying locations of one or more defective traces corresponding to one or more of the cells in the capacitive sensing device.

26. The method of claim 23, further comprising determining whether any differences in measured capacitance fall below predetermined thresholds corresponding thereto, thereby indicating shorted traces.

27. The method of claim 23, further comprising determining whether any differences in measured capacitance fall above predetermined thresholds corresponding thereto, thereby indicating broken traces.

28. The method of claim 23, wherein the mutual capacitance sensing device is a touchscreen.

29. The method of claim 23, wherein the mutual capacitance sensing device is a touchpad.

30. The method of claim 23, wherein the sense electrodes are interleaved.

31. The method of claim 23, wherein the sense electrodes are non-interleaved.

32. The method of claim 23, wherein the method is carried out during a process of manufacturing the device.

33. The method of claim 23, wherein the method is carried out after the device has been incorporated into an electronic device.

34. The method of claim 23, wherein the method is carried in the field.

35. The method of claim 23, wherein the sense and drive electrodes comprise indium tin oxide ("ITO").

36. The method of claim 23, wherein the method is carried out using an integrated circuit having steps corresponding thereto stored in a machine readable medium thereof.

37. The method of claim 23, further comprising incorporating the sensing device into an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device and a household appliance.

38. A method of testing a mutual capacitance sensing device for defective traces, comprising:
applying a drive signal to a first row or column of drive electrodes;
measuring a first capacitance resulting from the drive signal being applied to the first row or column of drive electrodes in a first column or row of sense electrodes forming an angle with respect to the first row or column;
measuring a second capacitance resulting from the drive signal being applied to the first row or column of drive electrodes in a second column or row of sense electrodes arranged substantially parallel to the first column or row of sense electrodes;
applying the drive signal to a second row or column of drive electrodes arranged substantially parallel to the first row or column of drive electrodes;
measuring a third capacitance resulting from the drive signal being applied to the second row or column of drive electrodes in the first column or row of sense electrodes;
measuring a fourth capacitance resulting from the drive signal being applied to the second row or column of drive electrodes in the second column or row of sense electrodes, the first, second, third and fourth measured capacitances corresponding to respective first, second, third and fourth cells in the sensing device, and
comparing the first, second, third and fourth measured capacitances to predetermined thresholds corresponding thereto.

39. The method of claim 38, further comprising determining differences between any pair of the first, second, third and fourth measured capacitances.

40. The method of claim 39, further comprising identifying one or more defective traces on the basis of the differences exceeding or falling below the predetermined thresholds.

41. A method of testing a mutual capacitance touch sensing device, comprising:
applying a drive signal to a first row or column of drive electrodes arranged substantially parallel to one another;
sequentially measuring respective relative mutual capacitances generated by and corresponding to the drive signal using a plurality of columns or rows of sense electrodes which intersect the rows or columns of drive electrodes at an angle, the columns or rows of sense electrodes being arranged substantially parallel to one another;
storing, in a computer readable medium, and associating with a processor, measured respective relative mutual capacitances with specific areas of the device;
determining with the processor whether any of the determined relative capacitances associated with different portions of the device exceed or fall below a predetermined threshold;
identifying one or more defective traces corresponding to one or more portions of the device associated with determined relative capacitances exceeding or falling below the threshold.

* * * * *

UNITED STATES PATENT AND TRADEMARK OFFICE
CERTIFICATE OF CORRECTION

| | | |
|---|---|---|
| PATENT NO. | : 8,279,197 B2 | Page 1 of 1 |
| APPLICATION NO. | : 12/547354 | |
| DATED | : October 2, 2012 | |
| INVENTOR(S) | : Thomas Murphy et al. | |

It is certified that error appears in the above-identified patent and that said Letters Patent is hereby corrected as shown below:

On the title page, item (75), correct the residence of the second inventor from "Campbell, CA (US)" to --Cambell, CA (US)--.

Signed and Sealed this
Twenty-fifth Day of December, 2012

David J. Kappos
*Director of the United States Patent and Trademark Office*